US009120557B2

(12) United States Patent
Antraygue et al.

(10) Patent No.: US 9,120,557 B2
(45) Date of Patent: Sep. 1, 2015

(54) PILOTING DEVICE FOR PILOTING A VEHICLE, IN PARTICULAR AN AIRCRAFT

(71) Applicant: RATIER FIGEAC, Figeac (FR)

(72) Inventors: Cedric Antraygue, Figeac (FR); Arnaud Soulie, Figeac (FR)

(73) Assignee: RATIER FIGEAC, Figeac (FR)

( * ) Notice: Subject to any disclaimer, the term of this patent is extended or adjusted under 35 U.S.C. 154(b) by 262 days.

(21) Appl. No.: 13/794,846

(22) Filed: Mar. 12, 2013

(65) Prior Publication Data

US 2013/0256462 A1  Oct. 3, 2013

(30) Foreign Application Priority Data

Mar. 27, 2012  (FR) ...................................... 12 00905

(51) Int. Cl.
G05G 9/047  (2006.01)
B64C 13/04  (2006.01)

(52) U.S. Cl.
CPC ................ *B64C 13/04* (2013.01); *G05G 9/047* (2013.01); *Y02T 50/44* (2013.01); *Y10T 74/20201* (2015.01)

(58) Field of Classification Search
CPC ..................... G05G 9/047; G05G 2009/04766; G05G 2009/04718; G05G 2009/04748; G05G 5/05; B64C 13/503
USPC ............... 74/471 XY, 471 R, 473.21, 473.24, 74/473.3, 473.33, 473.34, 473.35, 473.29; 244/236, 237, 234, 224, 228, 231, 221
See application file for complete search history.

(56) References Cited

U.S. PATENT DOCUMENTS

| 2,762,234 | A | * | 9/1956 | Dodd ........................... 74/471 R |
| 3,308,675 | A | * | 3/1967 | Jonsson ...................... 74/471 R |
| 3,870,161 | A | * | 3/1975 | Cording ......................... 212/289 |
| 3,978,738 | A | * | 9/1976 | Naulin ..................... 74/471 XY |
| 4,012,014 | A | * | 3/1977 | Marshall ....................... 244/234 |
| 4,127,841 | A | * | 11/1978 | Kato et al. ..................... 338/128 |
| 4,620,176 | A | * | 10/1986 | Hayes ........................... 338/128 |
| 4,947,701 | A | * | 8/1990 | Hegg ...................... 74/471 XY |
| 5,002,241 | A |   | 3/1991 | Tizac |

(Continued)

FOREIGN PATENT DOCUMENTS

| DE | 197 19 591 A1 | 11/1998 |
| EP | 0 352 417 A2 | 1/1990 |
| EP | 0 383 663 A1 | 8/1990 |

(Continued)

OTHER PUBLICATIONS

French Search Report, dated Dec. 10, 2012, from corresponding French application.

*Primary Examiner* — William Kelleher
*Assistant Examiner* — Jake Cook
(74) *Attorney, Agent, or Firm* — Young & Thompson

(57) ABSTRACT

A piloting device (1) for piloting a vehicle, in particular an aircraft, has a frame (10), a cradle (20) pivoting with respect to the frame on a first pivot axis (R), a piloting member, called a stick (30), pivoting with respect to the cradle (20) on a second axis (T) orthogonal to and intersecting the first axis, first return elements (11,11',12) for returning the cradle to a predetermined position with respect to the frame, called the neutral position of the cradle, second return elements (21,21', 22) for returning the stick to a predetermined position with respect to the cradle, called the neutral position of the stick, wherein at least one of the second return elements, called a stick jack (22), is arranged between the stick and the frame.

14 Claims, 2 Drawing Sheets

(56) References Cited

U.S. PATENT DOCUMENTS

| | | | |
|---|---|---|---|
| 5,050,449 A * | 9/1991 | Falcou et al. | 74/625 |
| 5,721,566 A | 2/1998 | Rosenberg et al. | |
| 5,900,710 A * | 5/1999 | Gautier et al. | 318/675 |
| 2002/0174736 A1 * | 11/2002 | Chapman | 74/471 XY |
| 2010/0025539 A1 * | 2/2010 | Hanlon et al. | 244/223 |

FOREIGN PATENT DOCUMENTS

| | | |
|---|---|---|
| FR | 1 417 732 A | 11/1965 |
| GB | 2 096 746 A | 10/1982 |

* cited by examiner

PILOTING DEVICE FOR PILOTING A VEHICLE, IN PARTICULAR AN AIRCRAFT

BACKGROUND OF THE INVENTION

1. Field of the Invention

The invention relates to a piloting device for piloting a vehicle, in particular a vehicle comprising at least one aerodynamic or hydrodynamic control surface, such as an aircraft or a watercraft.

Throughout the text, the term "piloting" and its derivatives denote, unless otherwise stated, the steering of a vehicle by a human pilot operating at least one piloting member such as a stick, handle, rudder bar, pedal, etc.

Traditionally, a piloting device for piloting a vehicle comprises at least one piloting member mounted and guided in rotation on at least one pivot joint about an axis with respect to a frame, and the information from rotation of the piloting member with respect to the frame is used to control the position and/or the displacements of the vehicle. Particularly in the case of a mini-stick for piloting an aircraft, the piloting member is mounted and guided in rotation on two pivot joints of orthogonal and intersecting axes (forming a centre-point joint).

2. Description of the Related Art

A first embodiment of such a piloting device, for example described in the document U.S. Pat. No. 5,721,566, consists in mounting the piloting member on two first pivot joints of orthogonal axes on idler arms which are themselves articulated by two other pivot joints on the frame. Such an assembly is heavy and bulky and moreover has the disadvantage of using generally eight pivot bearings, which increases the probability of seizing of one of these bearings.

A second embodiment of such a piloting device, for example described in the document EP 0 352 417, consists in mounting the piloting member on a first pivot joint with respect to an intermediate framework, and articulating this intermediate framework with respect to the fixed frame on a second pivot joint of axes orthogonal to and intersecting that of the first joint. However, when it is necessary to provide for a return of the piloting member to a predetermined position, usually at the centre of the displacement range, or "neutral" position, for example by means of elastic return elements, all the return elements for returning the piloting member to its neutral position with respect to the intermediate framework are installed on the latter, increasing its bulkiness and its inertia.

BRIEF SUMMARY OF THE INVENTION

The invention is therefore aimed at a piloting device according to this second embodiment, which does not have the disadvantages of the prior art.

The invention is also aimed at such a piloting device which has no coupling or at least a reduced coupling between the axes during the manoeuvres performed on the different axes.

The invention is likewise aimed at a piloting device which is more compact and of simplified and more economical production.

The invention is likewise aimed at a piloting device which is easier to maintain and certain parts of which are more easily replaceable.

The invention is further aimed at a piloting device having reduced clearances, fewer risks of seizing and friction and therefore more flexible manoeuvring.

The invention is also aimed at a piloting device which is lighter, easier to handle and more reliable than the devices of the prior art.

To achieve this, the invention relates to a piloting device for piloting a vehicle, in particular an aircraft, having:
- a frame,
- a cradle mounted for pivoting movement with respect to the frame on a first pivot axis, called the cradle axis,
- a piloting member, called a stick, mounted for pivoting movement with respect to the cradle on a second axis, called the stick axis, orthogonal to and intersecting the cradle axis,
- first return means for returning the cradle to a predetermined position with respect to the frame, called the neutral position of the cradle,
- second return means for returning the stick to a predetermined position with respect to the cradle, called the neutral position of the stick, wherein at least one of said second return means, called a stick jack, is arranged between the stick and the frame.

The return means for returning the stick to its neutral position with respect to the cradle are to be understood as means influencing the forces applied to the stick, whether they be active (for example a spring) or reactive (for example a damper). These return means may comprise various members such as one or more springs, arranged independently or in the form of a spring band, i.e. a telescopic device comprising a plurality of coaxial springs guided among one another, or else a spring damper (telescopic device comprising a spring coupled to a damper), a telescopic fluid damper, an electromechanical actuator controlled by a suitably programmed computer, etc.

In the rest of the description, the term "stick jack" or else "jack" is used to simplify the description, without this being considered as a limitation regarding the stick return means considered or its function.

Thus, by virtue of this original arrangement of the stick return means, it is possible to obtain a compact and reliable piloting device which has the minimum number of pivot bearings (two per axis), which makes it possible to reduce the friction at the bearings, to minimise the clearance between the stick and the frame and to limit the risks of one of the bearings seizing if this clearance is reduced.

The inventors have found that, surprisingly, the coupling between the pitch and roll movements of the stick was not very annoying since it was weakly felt by the pilots. This is because the return forces exerted by the jack on the stick depend essentially on the displacement speed of the stick and not on its position and are easily compensated for by the pilot.

Moreover, the arrangement of the stick jack between the stick and the frame generally means that the distance (in the direction of the roll axis) between the crossing point of the roll and pitch axes and the point at which the stick is fixed to the jack is relatively small compared with the length or the stroke of the latter. Consequently, the lever arm represented by this distance is small and minimises the component of the force exerted by the jack on the roll movement.

In addition, even if the elastic elements (springs for example) exerting the return force are in general light and compact and can be installed on the cradle without difficulty, it is possible by virtue of a stick jack combining spring and damper (for example spring damper or electromechanical actuator) which is arranged between the stick and the frame to achieve a redundancy of the function for returning the stick to the neutral position in order to improve the reliability of the piloting device. Moreover, the damping elements, particularly the linear-movement fluid dampers, which are bulkier and heavier, no longer have to be installed on the cradle, simplifying the construction of the latter and minimising its inertia.

Advantageously and according to the invention, the stick jack is connected to the stick by a spherical joint. Such a spherical joint, embodied by a ball joint, enables the stick to perform all the combined pivoting movements on the two axes of the piloting device for the usual angular deflections (of the order of 60 degrees on either side of the neutral position) and minimises any coupling between the two axes. Of course, this spherical joint which is like a centre-point joint may be realised by any equivalent means known, such as a cardan joint or the like.

Advantageously and according to the invention, the centre of said spherical joint is situated substantially on the pivot axis of the cradle when the stick is in the neutral position of the stick. Therefore, the pivoting movements on the cradle axis are largely absorbed by the ball joint (in particular completely absorbed if the stick is in its neutral position).

Advantageously and according to the invention, the stick jack is connected to the frame by a spherical joint. Therefore, any variation of the position of the ball joint for fixing the stick jack to the stick does not cause misalignment of the stick jack, and the rod and the piston of the stick jack (in the case of a linear-movement fluid damper for example) are always aligned with the body of the latter, avoiding any risk of interference which would be detrimental to the continuity of the movement.

Advantageously and according to the invention, the stick jack is arranged such that its longitudinal axis is situated in a plane orthogonal to the stick axis passing through the cradle axis when the cradle is in the neutral position of the cradle. The jack is thus placed in a plane of symmetry of the movements of the cradle, minimising the lateral displacement and the deflection of the jack during the pivoting movements about the cradle axis.

Advantageously and according to the invention, the cradle has an opening adapted to permit the passage of the stick jack whatever the pivoting angle of the cradle and of the stick. In particular, by designing the cradle in the form of an open framework, the stick jack can be directly connected between the latter and the frame without requiring complex transmission parts.

Advantageously and according to the invention, the cradle is connected to the frame by a member of the first return means, called the cradle jack, arranged between the cradle and the frame, substantially parallel to the stick jack. By arranging the cradle jack parallel to the stick jack, the two jacks can have similar dimensional characteristics and be designed identically, which makes it possible to minimise the number of different listed parts necessary for maintenance of the piloting device according to the invention and to increase the quantities of identical parts to be produced and thus reduce the cost price thereof. It should also be noted that the term "cradle jack" is used in a manner parallel to the use of the term "stick jack" without prejudging the member of the first return means considered nor its function.

Advantageously and according to the invention, at least one of the jacks is a tubular fluid damper. This type of damper is more precise and more reliable than the rotary or frictional dampers of the prior art. In addition, they are adapted to produce a damping of turbulent type, i.e. producing a force proportional to the square of the displacement speed, thus making it possible to apply a very small force for slow displacements and a very high force in the case of rapid displacement. Such behaviour is particularly sought-after for applications such as piloting sticks.

Advantageously and according to the invention, the stick is comprised of by a handle fixed demountably to a plate, called the pivot plate, traversed by the stick axis. The handle thus becomes an easily replaceable part, not requiring complete dismantling of the piloting device.

Advantageously and according to the invention, the handle has at least one electrical member connected to an electrical connector adapted to cooperate with a corresponding connector integral with the pivot plate. The demounting and replacement of the handle makes it possible, by virtue of the connectors electrically connecting the handle to the rest of the electrical systems of the piloting device, to replace the switches (PTT radio switches and/or switches for engaging the autopilot, for example) or the tactile indicators (vibrator) included in the handle.

Advantageously and according to the invention, the pivot plate has means for driving in rotation a rotation shaft of at least one angle sensor integral with the cradle. The angle sensors for sensing the angular position of the stick are directly driven for example by gearing formed in the pivot plate cooperating with corresponding gearing fixed on the rotation shaft of the sensor fixed on the cradle. The adjustment of these drive means is carried out during the assembly of the cradle before mounting of the latter in the rest of the piloting device, thus facilitating the operations for production of the device according to the invention.

Advantageously and according to the invention, the frame, the cradle and the stick each have an indexing hole arranged such that these holes are aligned when the cradle and the stick are in their respective neutral position, so as to permit the insertion of an indexing pin adapted to lock the cradle and the stick with respect to the frame. By virtue of this indexing pin, the various adjustments (for example tension of the return springs, adjustment of the position sensors, etc.) which are carried out in the neutral position of the stick and of the cradle are simplified. In addition, this pin enables transportation and mounting of the device in the vehicle to be equipped while preserving this neutral position and enables adjustment of systems outside the device (for example control surfaces controlled by the device) without risk of position error.

The invention advantageously applies in particular to an aircraft such as an aeroplane or a helicopter. In this case, the piloting device is a mini-stick for piloting an aircraft. The invention therefore also extends to an aircraft comprising at least one piloting member connected to at least one control surface of the aircraft for controlling the position and displacements thereof, wherein it comprises at least one piloting device according to the invention for controlling at least one control surface of this aircraft. The invention applies, however, also to other types of vehicles, in particular land vehicles and floating or underwater vessels, for example for controlling at least one hydrodynamic control surface of the latter.

The invention also relates to a piloting device for piloting a vehicle and an aircraft, characterised in combination by all or part of the features mentioned above or below.

BRIEF DESCRIPTION OF THE DRAWINGS

Other objects, features, and advantages of the invention will become apparent on reading the following description of one of its preferred embodiments given solely by way of non-limiting example and with reference to the appended figures in which.

DETAILED DESCRIPTION OF THE PREFERRED EMBODIMENTS

Figure 1:
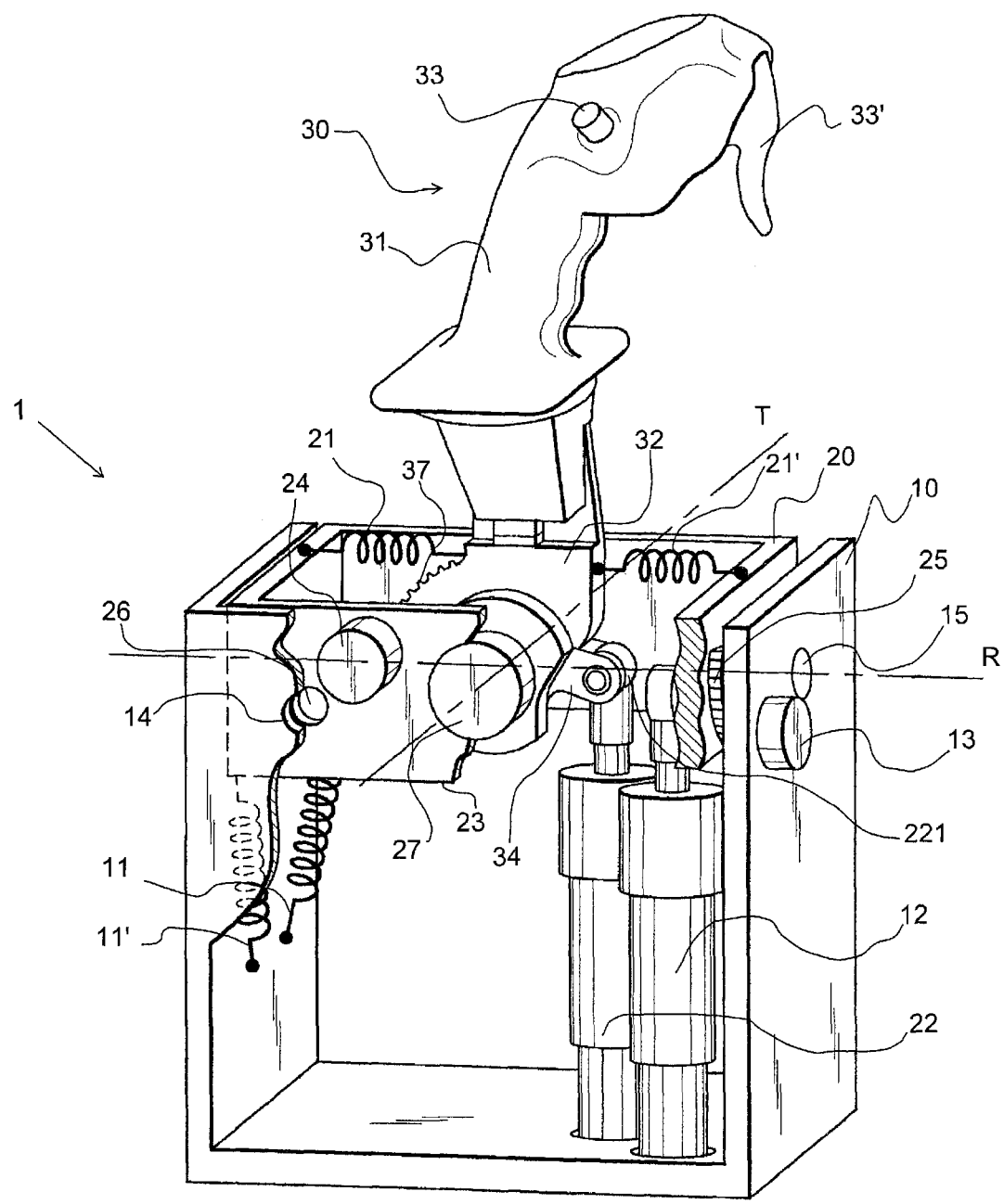
FIG. 1 shows a perspective, partially exploded, view of a piloting device according to the invention.

In the part of the description which follows, the stick jack taken by way of example is a linear fluid damper. FIG. 1 shows schematically a piloting device 1 according to the invention, for example in the form of a mini-stick for piloting aircrafts, in which a piloting member or stick 30 is mounted and guided in rotation on two pivot joints of orthogonal and intersecting axes with respect to a frame 10. The stick 30 pivots about an axis T or pitch axis (with reference to the movement of the aircraft controlled by this movement) embodied by bearings 27 arranged in the lateral sides of a cradle 20 in the form of a rectangular framework. The stick 30 and the cradle 20 pivot integrally about an axis R or roll axis (again with reference to the movements of the aircraft) embodied by bearings 15 arranged in the walls of the frame 10 which are placed opposite the sides adjacent to the lateral sides of the cradle 20 carrying the bearings 27.

Of course, the pitch axis T and roll axis R are arbitrarily designated in this way, it being possible for their function to be interchangeable. Similarly, the function of the stick 30 may be different from the roll or pitch control, for example it may control forward/rearward travel according to the first pivoting movement and right/left orientation according to the second pivoting movement.

The cradle 20 is adapted to pivot about the roll axis over an angular stroke of about 60° on either side of a position, called the neutral position of the cradle, in which the plane of the cradle 20 defined by the roll axis and pitch axis is substantially parallel to the base of the frame 10. The cradle 20 is returned to this neutral position of the cradle by two springs 11 and 11' fixed between the frame 10 and the cradle 20. In order to avoid the occurrence of oscillations on the return of the cradle to the neutral position when the cradle is moved away from its neutral position and then released, a damper 12, preferably of the linear fluid type, is fixed between the frame 10 and the cradle 20, the point at which the head of the damper 12 is fixed to the cradle 20 being distant from the pivot axis of the latter. Such a damper exerts, in a known manner, a force dependent on the linear displacement speed of its rod with respect to its body and in the direction opposite thereto. The stiffness of the two springs 11 and 11' and the damping characteristic (force as a function of the speed) of the damper are chosen so as to ensure a critical damping curve for the movement of the cradle.

The cradle 20 also has at least one toothed angular sector 25 integral with the cradle and having its centre situated on the roll axis. This toothed angular sector 25 cooperates with gearing placed on the axis of a position sensor 13 integral with the frame so as to drive the axis of rotation of the sensor. The position sensor 13 can thus provide information regarding the angular position of the cradle 20 with respect to the frame 10.

Similarly, the stick 30 has, with respect to the cradle 20, an angular stroke of about 60° on either side of a position, called the neutral position of the stick, in which the stick is substantially orthogonal to the plane of the cradle 20 defined by the roll and pitch axes. The stick 30 is returned to this position under the effect of two springs 21 and 21' exerting a return force on the stick proportional to the angular distance between the position of the stick and its neutral position.

Figure 3:
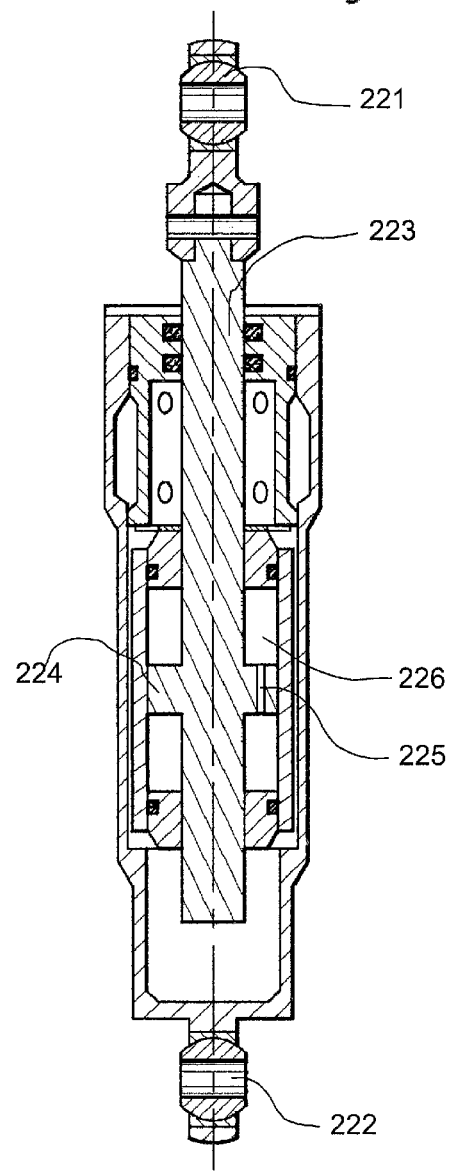
FIG. 3 is a sectional view of a damper used in the piloting device according to the invention.

According to the invention, a damper 22 is arranged between the frame 10 and a lug 34 integral with a pivot plate 32 forming part of the stick 30. The head of the damper 22 is fixed to the lug 34 via a ball joint 221 (FIG. 3) forming a spherical joint between the head of the damper 22 and the stick 30. The centre of the ball joint 221 is placed at a distance from the pitch axis T so that the pivoting of the stick 30 about the axis T causes a displacement of the head of the damper with respect to its body. Preferably, the centre of the ball joint 221 is placed on the roll axis R when the stick 30 is in its neutral position so that a pivoting of the cradle 20 about the axis R results in a rotation of the ball joint without causing a displacement of the head of the damper with respect to its body. Of course, when the stick 30 is not in its neutral position, a pivoting of the stick 30 and cradle 20 assembly about the roll axis is likely to cause a displacement of the head of the damper 22 both with respect to its body and on either side of a plane orthogonal to the plane of the cradle passing through the roll axis. To avoid any interference between the shaft of the damper and its body, the damper 22 is also fixed to the frame 10 by a spherical joint represented by the ball joint 222. In this way, the alignment between the body of the damper and the rod of the latter is always maintained. Preferably, the stick damper 22 is arranged such that its longitudinal axis is situated in a plane orthogonal to the pitch axis T of the stick when the cradle 20 is in its neutral position. In this way, the inclination of the shaft of the damper 22 on either side of this plane, during the pivoting of the cradle about the roll axis, is symmetrical with respect to this orthogonal plane.

The inventors have found that, surprisingly, this arrangement of the damper 22 caused only a minimal coupling reaction between the pitch and roll movements of the stick. This is because the forces exerted by the damper 22 on the stick 30 depend only on the displacement speed of the stick and not on its position. Moreover, owing to the length of the damper 22 and the lever arm of the lug 34, the component of the force exerted by the damper 22 on the roll movement is very low and can be easily compensated for by the pilot.

Advantageously, the cradle is embodied in the form of a framework, at least the lower part of which has an opening 23 so as to permit the passage of the head of the damper 22. In this way, the stick damper 22 and the cradle damper 12 can be arranged substantially parallel to one another so as to minimise the space requirement of these elements in the piloting device. It is thus possible to use tubular fluid dampers, of the type shown in FIG. 3, the precision and reliability of which is much better than that of friction dampers. Such a tubular fluid damper has a body in the interior and along the longitudinal axis of which a rod 223, carrying a piston 224, is adapted to move over a predetermined stroke. The piston 224 is displaced in a chamber 226 filled with a fluid, for example oil, which flows on either side of the piston 224 via a restriction 225. Advantageously, the rod 223 extends on either side of the piston 224 and passes through the end plugs of the chamber 226 so as not to generate variations in the fluid volume.

Figure 2:
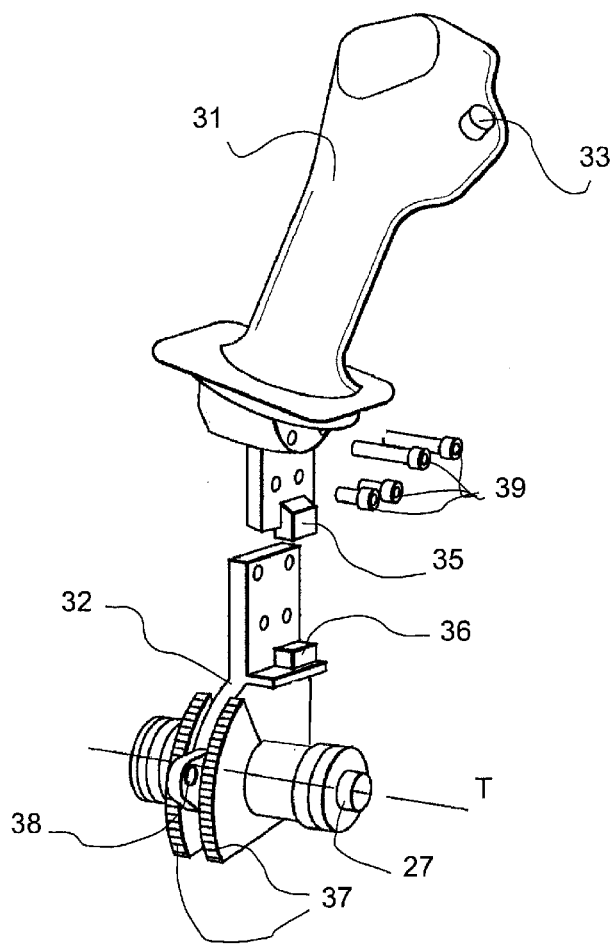
FIG. 2 shows a stick (piloting member) forming part of the piloting device according to the invention.

Reference will now be made to FIG. 2 in which is shown a stick 30 according to the invention, constituted by a handle 31 and a pivot plate 32. The handle 31 has electrical members, such as for example a button 33 for engaging the autopilot or a trigger 33' (FIG. 1) for controlling the radio communication between the pilots, or else a vibrator integrated in the handle 31 to inform the pilot that two sticks are operating in parallel. These electrical members are susceptible to failure and it is necessary to be able to replace them easily without having to dismantle the entire piloting device. The handle 31 is therefore a separable element of the stick 30 and is joined to the pivot plate 32 via screws 39 and a connector 35 cooperating with a corresponding connector 36 fixed to the pivot plate. It is thus possible, by moving out of the way a bellows (not shown) covering the space between the upper part of the frame and the stick 30, to replace the handle 31 without having to dismantle the entire piloting device according to the invention.

The pivot plate 32 has the elements of the bearing 27 along the pitch axis T and, extending concentrically to this axis, two toothed angular sectors 37 adapted to drive in rotation the shaft of a position sensor 24 mounted on the cradle 20. The pivot plate 32 also has a lug with an indexing hole 38 therein. The indexing hole 38 is adapted to be aligned with an indexing hole 26 provided in the cradle 20 and an indexing hole 14 provided in the frame 10 when the cradle and the stick are in their respective neutral position. An indexing pin (not shown) can then be inserted into the three indexing holes to lock the stick and the cradle in the neutral position of each of these parts so as to carry out, for example, the various tension adjustments of the springs 11,11',21, and 21'.

A description has thus been given of a piloting device of simplified design enabling reduced weight and space requirement to be obtained, which advantageously enables it to be used as a mini-stick for piloting an aircraft.

Of course, this description is given by way of illustrative example only and a person skilled in the art could make numerous modifications to it without departing from the scope of the invention, such as for example could replace the damper by a spring damper or a suitably programmed electromechanical actuator.

The invention claimed is:

1. A piloting device (1) for piloting a vehicle, in particular an aircraft, having:
   a frame,
   a cradle mounted for pivoting movement with respect to the frame on a first pivot axis (R), called the cradle axis,
   a piloting member, called a stick, mounted for pivoting movement with respect to the cradle on a second axis (T), called the stick axis, orthogonal to and intersecting the cradle axis,
   first return means for returning the cradle to a predetermined position with respect to the frame, called the neutral position of the cradle,
   second return means for returning the stick to a predetermined position with respect to the cradle, called the neutral position of the stick,
   wherein said second return means includes a stick jack arranged between the stick and the frame,
   wherein the stick jack is connected to the stick by a spherical joint, and
   wherein the center of said spherical joint is situated substantially on the pivot axis (R) of the cradle when the stick is in the neutral position of the stick.

2. The piloting device as claimed in claim 1, wherein the stick jack is connected to the frame by a spherical joint.

3. The piloting device as claimed in claim 1, wherein the stick jack is arranged such that its longitudinal axis is situated in a plane orthogonal to the stick axis (T) when the cradle is in the neutral position of the cradle.

4. The piloting device as claimed in claim 1, wherein the cradle has an opening adapted to permit the passage of the stick jack for every pivoting angle of the cradle and of the stick.

5. The piloting device as claimed in claim 1, wherein the cradle is connected to the frame by a member of the first return means, called the cradle jack, arranged substantially parallel to the stick jack.

6. The piloting device as claimed in claim 5, wherein at least one of the cradle jack and the stick jack is a tubular fluid damper.

7. The piloting device as claimed in claim 1, wherein the stick is comprised of a handle fixed demountably to a plate, called the pivot plate, traversed by the stick axis (T).

8. The piloting device as claimed in claim 7, wherein the handle has at least one electrical member connected to an electrical connector adapted to cooperate with a corresponding connector integral with the pivot plate.

9. The piloting device as claimed in claim 7, wherein the pivot plate has means for driving in rotation a rotation shaft of at least one angle sensor integral with the cradle.

10. The piloting device as claimed in claim 1, wherein the frame, the cradle and the stick each have an indexing hole arranged such that these holes are aligned when the cradle and the stick are in their respective neutral position, so as to permit the insertion of an indexing pin adapted to lock the cradle and the stick with respect to the frame.

11. The piloting device as claimed in claim 1, wherein the piloting device is a mini-stick for piloting an aircraft.

12. An aircraft comprising at least one piloting member connected to at least one control surface of the aircraft for controlling the position and displacements thereof, wherein it comprises at least one piloting device as claimed in claim 1 for controlling at least one control surface of the aircraft.

13. The piloting device as claimed in claim 8, wherein the pivot plate has means for driving in rotation a rotation shaft of at least one angle sensor integral with the cradle.

14. A piloting device (1) for piloting a vehicle, in particular an aircraft, having:
   a frame;
   a cradle mounted for pivoting movement with respect to the frame on a first pivot axis (R), called the cradle axis;
   a piloting member, called a stick, mounted for pivoting movement with respect to the cradle on a second axis (T), called the stick axis, orthogonal to and intersecting the cradle axis;
   first return means for returning the cradle to a predetermined position with respect to the frame, called the neutral position of the cradle;
   second return means for returning the stick to a predetermined position with respect to the cradle, called the neutral position of the stick,
   wherein said second return means includes a stick jack arranged between the stick and the frame, and
   wherein the frame, the cradle and the stick each have an indexing hole arranged such that these holes are aligned when the cradle and the stick are in their respective neutral position, so as to permit the insertion of an indexing pin adapted to lock the cradle and the stick with respect to the frame.

* * * * *